United States Patent [19]

Heidemeyer et al.

[11] 4,252,208
[45] Feb. 24, 1981

[54] METHOD AND APPARATUS FOR OPERATING A MOTOR VEHICLE

[75] Inventors: Paulus Heidemeyer; Peter Hofbauer, both of Wolfsburg, Fed. Rep. of Germany

[73] Assignee: Volkswagenwerk AG, Wolfsburg, Fed. Rep. of Germany

[21] Appl. No.: 955,186

[22] Filed: Oct. 27, 1978

[30] Foreign Application Priority Data

Oct. 29, 1977 [DE] Fed. Rep. of Germany ....... 2748697

[51] Int. Cl.$^3$ .............................................. B60K 9/04
[52] U.S. Cl. ..................................... 180/165; 74/859; 192/0.077
[58] Field of Search ................... 180/54 R, 165, 54 F; 74/751, 859, 572; 192/0.033, 0.075, 0.077

[56] References Cited

U.S. PATENT DOCUMENTS

| | | | |
|---|---|---|---|
| 2,935,899 | 5/1960 | Nallinger | 180/165 X |
| 3,711,311 | 11/1973 | Herbst | 180/165 X |
| 3,734,222 | 5/1973 | Bardwick | 180/165 |
| 3,870,116 | 3/1975 | Seliber | 180/165 |
| 3,882,950 | 5/1975 | Strohlein | 180/165 |
| 3,886,810 | 6/1975 | Sugiyama et al. | 180/165 X |

FOREIGN PATENT DOCUMENTS 229233 12/1910 Fed. Rep. of Germany ........... 180/165
719124 4/1942 Fed. Rep. of Germany ........... 180/165

*Primary Examiner*—John J. Love
*Assistant Examiner*—Michael Mar
*Attorney, Agent, or Firm*—Brumbaugh, Graves, Donohue & Raymond

[57] ABSTRACT

A motor vehicle and a method of operation thereof. The method and apparatus relate to motor vehicles having an internal combustion engine for driving the vehicle and a flywheel coupled to the engine for equalizing the non-uniformity of the engine output torque. In accordance with the invention, at operating conditions wherein both the engine does not drive the vehicle and the flywheel rotates above a predetermined minimum speed, the coupling between the engine and the flywheel is automatically interrupted and the engine is stopped. Upon termination of these operating conditions, the flywheel is re-coupled to the engine to restart the engine. The coupling is preferably a controllable clutch arranged between the engine and flywheel, and the interruption of the coupling between the engine and flywheel is controlled as a function of one or more parameters representative of the operating state of the vehicle.

24 Claims, 3 Drawing Figures

METHOD AND APPARATUS FOR OPERATING A MOTOR VEHICLE

FIELD OF INVENTION

The invention concerns a method and apparatus for operating a vehicle, in particular a passenger automobile, with a driving motor consisting of an internal combustion engine and a flywheel following the engine for equalizing the non-uniformity of the engine output torque.

BACKGROUND

Throughout much of the operational time of a vehicle, in particular a passenger automobile, the engine runs without driving the vehicle. For example, during intermittent shorttime stopping of the vehicle, e.g., due to traffic conditions, the engine, with the transmission in neutral, will continue to turn at the idling speed. Also, during deceleration and coasting, not only is the engine not driving the vehicle but it will itself be driven at a higher speed by the vehicle's forward momentum acting through the wheels of the car and transmission. Such coasting or deceleration occurs not only on driving downhill but whenever during travel the driver releases the gas pedal.

In both operating conditions, deceleration as well as idling, fuel delivered to the engine is wasted inasmuch as it is not utilized to drive the vehicle. In some cases of coasting and deceleration, braking by the engine is desirable for reasons of safety to boost the main foot brake, since the engine is used to dissipate kinetic energy. In cases other than travel down a steep incline, however, the fact that the engine continues to run when not powering the vehicle constitutes an extremely unprofitable utilization of fuel, a resource becoming scarcer and scarcer.

SUMMARY OF THE INVENTION

This invention relates to a method of operating a vehicle which offers a more effective utilization of fuel, and to a vehicle operated in accordance with such method.

More particularly, the present invention relates to an engine having a flywheel coupled to the engine for equalizing the non-uniformity of the engine output torque. In accordance with the invention, at operating conditions in which both the engine does not drive the vehicle and the flywheel rotates above a predetermined minimum speed, the coupling between the engine and the flywheel is automatically interrupted and the engine is stopped, and on termination of such operating conditions, the flywheel is again coupled to the engine to restart the engine. Due to the fact that the connection between the engine and the flywheel will be interrupted at certain operating states, e.g., on idling or coasting, and the engine thus stopped, the fuel otherwise uselessly consumed in these operating conditions can be saved. The interruption of the connection between the engine and the flywheel, which in a vehicle operated in accordance with this method may be by means of a controllable clutch interposed therebetween, moreover offers the possibility of easily starting the engine again after termination of the idling or coasting operating conditions, with the help of the flywheel which continues to rotate throughout. In many engines, e.g. the common four-cylinder four-stroke engine, the crank mechanism is acted on only temporarily by the gas forces, and the moment of inertia alone is not sufficient for uniform continuation of the rotation. Thus, the interruption of the connection between the engine and the flywheel on idling will be itself sufficient to stop the engine. However, if the engine is such that it will not stop by itself on uncoupling of the flywheel, an ignition circuit cutoff or a control signal interrupting the fuel supply may be used to assist.

The interruption and re-establishment of the connection between the driving motor and the flywheel, as well as the stopping of the engine, may be controlled as a function of parameters characterizing the operating state of the vehicle. Suitable control quantities which may be used, for example, are the engine output, the rotational speed of the flywheel, the speed of the vehicle, the operating position of the transmission, or the inclination of the vehicle. Utilization of the inclination of the vehicle is desirable so that the automatic interruption of the coupling between the engine and the flywheel, which would otherwise take place during coasting, is prevented when the vehicle is going downhill, and thereby the engine will remain connected to the drive train to help with braking the vehicle.

In accordance with this invention, automatic disengagement of the main clutch, which will be arranged between the flywheel and the transmission, may be provided at certain operating conditions of the vehicle, for example when the accelerator pedal is released or the brake pedal is depressed. Thus, during periods of deceleration, coasting, and stopping due to traffic, the flywheel, since it will be disconnected from the transmission and thus the slowing down or stopped drive wheels as well as the stopped engine, will continue to rotate freely. The flywheel will continue to store kinetic energy until it is again desired to start the engine, in which case the driver need only depress the accelerator pedal to reconnect the engine and flywheel.

The advantages attained by the invention consist above all in a substantial decrease in fuel consumption and in noise, as well as in the elimination of noxious substances in the exhaust gas of the automobile. The decrease in fuel consumption is attained not only because the engine is turned off during deceleration and certain idling states, thus using no fuel, but also because the method in accordance with the invention, as a controlled freewheel system, promotes the increased use of more efficient engine operating states. This results because internal combustion engines inherently operate more efficiently at higher loads. In place of operating continuously at partial loads, the vehicle may instead be operated intermittently at higher loads, having the engine run subsequently in the idling or deceleration state. Moreover, the starting process can be substantially improved in that, through suitable operation of the clutches, initially only the flywheel is accelerated to its starting speed by the starter motor. Thereafter, through engagement of the clutch arranged between the flywheel and the engine, the engine will be started. With the help of such an improved starting system, sure starting may be achieved even at low outside temperatures because of the higher starting rotational speed provided, while the starting device is simplified at the same time, e.g., in the form of diminished size of the starter, protection of the battery from peak currents, no need for heater plugs in diesel engines, and reduction of the fuel used during cold starting. Even if the engines in question are used for stationary aggregates, e.g., heat pumps, advantages are attained in that, for example, for starting, the customary electric starter with starter battery and battery charger or generator need not be present. Instead, it is now possible to operate with a relatively small starter motor supplied through the power system and such a motor, due to its limited current consumption, cannot overload supply systems with low-voltage protection, such as dwellings.

BRIEF DESCRIPTIONS OF THE DRAWINGS

For a better understanding of the invention, reference is made to the accompanying drawings, and the detailed description thereof, in which.

DETAILED DESCRIPTION

Figure 1:
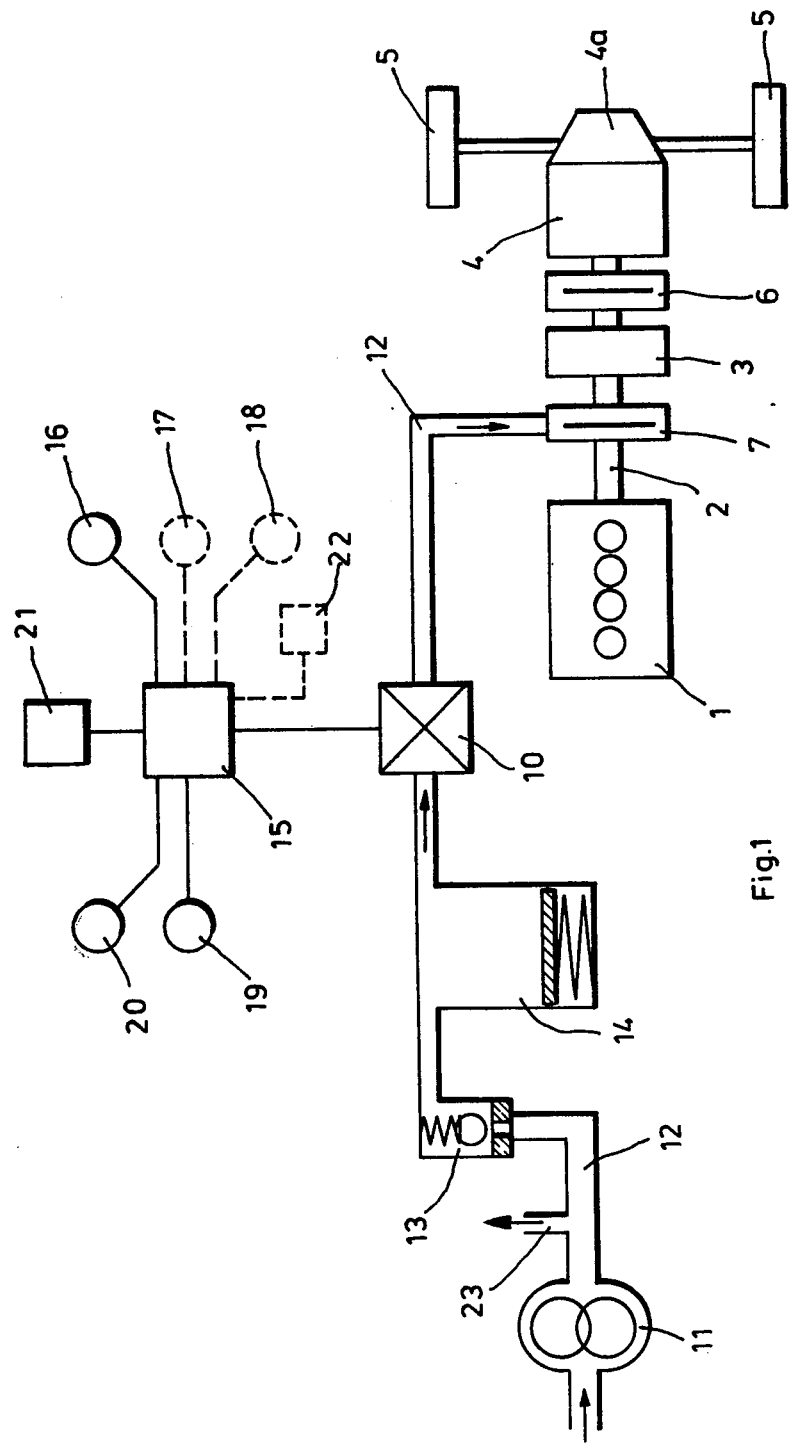
FIG. 1 is a schematic diagram of a vehicle which may be operated by the method in accordance with the invention.

In FIG. 1, a motor vehicle has an engine 1, e.g., a four-cylinder four-stroke Otto engine, which drives the driving wheels 5 of the automobile by means of a transmission 4 and a differential axle gear 4a. Coupled to the engine crankshaft 2, and arranged between the engine 1 and transmission 4, is a flywheel 3 which equalizes the non-uniformities of the engine torque. The customary main clutch 6 is arranged between the flywheel 3 and the transmission 4 which is actuated for the purpose of interrupting the tractive connection between the engine 1 and the transmission 4 in order to shift gears.

In accordance with the invention, there is furthermore arranged between the engine 1 and the flywheel 3 a second controllable clutch or flywheel clutch 7 which at certain operating conditions of the automobile, in particular on idling and deceleration, is used to disconnect the engine 1 from the successive elements. This flywheel clutch 7 may be actuable in any suitable manner, for example, hydraulically, the action on the clutch by the hydraulic mechanism being controlled by a valve 10, the valve 10, in turn, being connected with a control device 15 for delivery of control signals causing the engagement and disengagement of the clutch. The control device 15 processes several parameter signals delivered by signal generators and characterizing the operating condition of the automobile. For example, a signal generator 16 may be provided for delivery of a load-dependent control signal; another signal generator 17 delivers a speed-dependent signal; a signal generator 18 delivers a gear position-dependent signal; signal generator 19 detects the speed of the flywheel 3 and generates a signal to the control device 15; a signal transmitter 20 detects the inclination of the vehicle; and finally, a switch 21, which can be actuated manually, is provided which when activated disconnects the automatic control of the flywheel clutch 7 to retain the flywheel clutch 7 in the engaged position regardless of the operating state of the engine. In cases where disengagement of the flywheel 3 from the engine 1 will not assure that the engine will stall (due to its non-uniform torque), or as an additional assurance that the engine will in fact stop when the flywheel is disengaged, a relay 22 may be connected into the ignition circuit of the engine 1 or a fuel cut-off valve in the fuel line, and may be acted on through the control device 15 by means of a signal for interruption of the ignition or the fuel feed, respectively.

FIG. 1 also illustrates the delivery system of the hydraulic fluid to the flywheel clutch 7, including a supply pump 11, a supply line 12 leading to the clutch 7, a nonreturn valve 13 and a pressure reservoir 14 inserted into the said line ahead of the hydraulic control valve 10. A fluid line 23 branching off behind the supply pump 11 may be used to supply fluid to other components.

In accordance with the invention, the flywheel clutch 7 arranged between the engine 1 and the flywheel 3 is actuated automatically, i.e., without any action by the passenger or driver, and is disengaged for the purpose of disconnecting the mechanical coupling between the motor 1 and the flywheel 3 whenever the motor 1 is in decelerating or idling operation. Both these operating conditions are indicated by the position of the accelerator pedal which determines the engine load and is actuated during operation by the driver. If in case of a normally running engine the accelerator pedal is released, the engine will be in one of two operating states, either deceleration or idling. The former is distinguished in that the engine is not rotating at its idling speed, but at a speed determined by the traveling speed of the vehicle and the particular transmission gear engaged. In order to detect these operating conditions, the signal generator 16 may be a switch connected to the gas pedal and delivering to the control device 15 a signal as long as the gas pedal is in its released (idle) position. In place of the gas pedal, the control quantity used could also be the position of the intake throttle which will be actuated through the gas pedal.

The disengagement of the flywheel clutch 7 and stopping of the engine during operation of the vehicle is advantageous only as long as the flywheel 3 has a sufficient rotational velocity to restart the engine when re-connected to the engine 1 at the termination of the idling or deceleration condition. Thus, the signal of transmitter 19 is used for purposeful control of the actuation of the flywheel only when the flywheel is rotating above a predetermined minimum speed. The control device 15 then forwards a signal for actuation (disengagement) to the control valve 10 whenever both the signal generator 16 indicates that the accelerator pedal is in its released position and the signal generator 19 indicates a speed of the flywheel 3 which is above a predetermined value.

In addition to a determination of the speed of the flywheel 3 as provided by the signal generator 19, the speed of travel together with the position of the transmission gears 4 may be determined and a signal corresponding thereto provided by transmitters 17 and 18. In such a case, the control device 15 would be designed to effect uncoupling through the control valve 10 only above a minimum travel speed, unless the transmission is in the idling position.

At certain times, for example, during extended downhill travel over inclined roads, it is desirable to use the braking effect of the engine to assist the vehicle's foot brakes. In order to make use of the braking effect of the engine in support of the foot brake, which may become heavily stressed thermally, a signal transmitter 20 detecting the inclination of the vehicle may be provided in accordance with the invention. Such a signal transmitter would provide a signal such that on inclinations above a prescribed threshold valve, e.g. 6%, the control device will not emit a signal for disengagement of the flywheel clutch 7. The signal transmitter in question may be a gradient switch fixed on a stationary, non-deformable part of the vehicle body. In place of such a gradient switch, or in addition thereto, a manually operated switch 21 may likewise be provided. Using this switch 21, the driver can disconnect the entire clutch disengagement control, and the vehicle will operate in the customary manner, the driving motor 1 and the flywheel 3 being permanently rigidly connected as long as that switch 21 is actuated.

The vehicle may also have a mechanism, independent of the manually operated switch 21 or the gradient switch 20, which will permit the driver to choose whether the vehicle is to be operated with or without actuation of the control clutch, i.e., disconnection of the driving motor, when the accelerator pedal is in the idling position. This may be done by having an accelerator pedal mechanism which has a two stage idling position. Thereby, the automatic uncoupling of the engine is obtained at complete release of the gas pedal by a switch acting on the control device 15, whereas upon partially depressing the gas pedal, that is, to the second stage idling position, the customary idling or deceleration operation, without disengagement of the engine from the flywheel, is obtained. In the case of a vehicle with a gas pedal designed in this manner, the driver must thus bring back the pedal beyond the second stage idling position in order to attain the driving stage with a disengaged and stopped engine in the deceleration mode.

In accordance with the invention, it is further provided that the engine 1 is stopped after uncoupling of the flywheel 3. A four-stroke reciprocating piston engine with four or fewer cylinders will stall by itself when the flywheel is uncoupled, since, with an engine of this type having non-uniform torque applied by the pistons, the flywheel effect of the rotating engine is not sufficient to keep it going. With engines having a larger number of cylinders, or if otherwise necessary, the engine may be stalled, and thus the fuel savings achieved, by temporarily interrupting the ignition spark or fuel delivery in the case of Otto engines, or of interrupting the fuel injection mechanism in the case of a diesel engine. Towards such end, a relay 22 is provided in the embodiment as per FIG. 1, which is arranged in the ignition circuit of the engine 1 (Otto engine), such relay 22 being actuated by the control device 15 synchronous with the control valve 10 for temporary interruption of the ignition. Inasmuch as the engine, on stopping, will cool off only slowly, especially if the water pump has likewise been stopped, the engine remains in continuous operating readiness and can be put under full load immediately after resumption of running without any difficulty or danger.

As a rule, the pressure and lubricant supply pump 11 driven by the engine stops simultaneously with the engine. However, the fluid pressure then still available is generally sufficient in order to supply lubricant to the various engine components. Optionally, it may also be possible in case of lack of sufficient fluid pressure to engage again the control clutch 7 in order to start the engine and/or make available during a prescribed period a residual oil pressure from a pressure reservoir for the lubricating points of the engine prior to its restarting.

In the vehicle shown in FIG. 1, the main clutch 6 is designed as a customary control clutch which can be operated at will when changing gears in the mechanical manually operated transmission 4. Evidently, the invention may also be applied to automatic transmissions, in which a hydrodynamic converter takes the place of the main clutch 6.

In a further refinement of the invention, the connection of the flywheel 3 with the driving wheels 5 is interrupted at certain operating states through automatic disengagement of the main clutch so that the flywheel continues to run separated both from the engine 1 and from the driving wheels 5 with relatively small frictional losses. To control this process, the speed of the flywheel 3 may again be used which on exceeding of a prescribed limit effects the disengagement of the main clutch 6. The automatic disengagement of the main clutch 6 may also be associated with the actuation of the foot brake or the release of the accelerator pedal. By means of this measure, it would be obtained that the vehicle on deceleration and also on stopping, e.g., due to traffic conditions, could be maintained ready to operate with the engine 1 disconnected and the flywheel 3 in rotation. This would result in a considerable decrease in fuel consumption and emission of exhaust gases, advantageous particularly in city traffic with its frequent stop and go traffic resulting in acceleration and deceleration at short intervals. As is known, the customary engines produce considerable quantities of exhaust gases during the stopping and starting processes.

Figure 2:
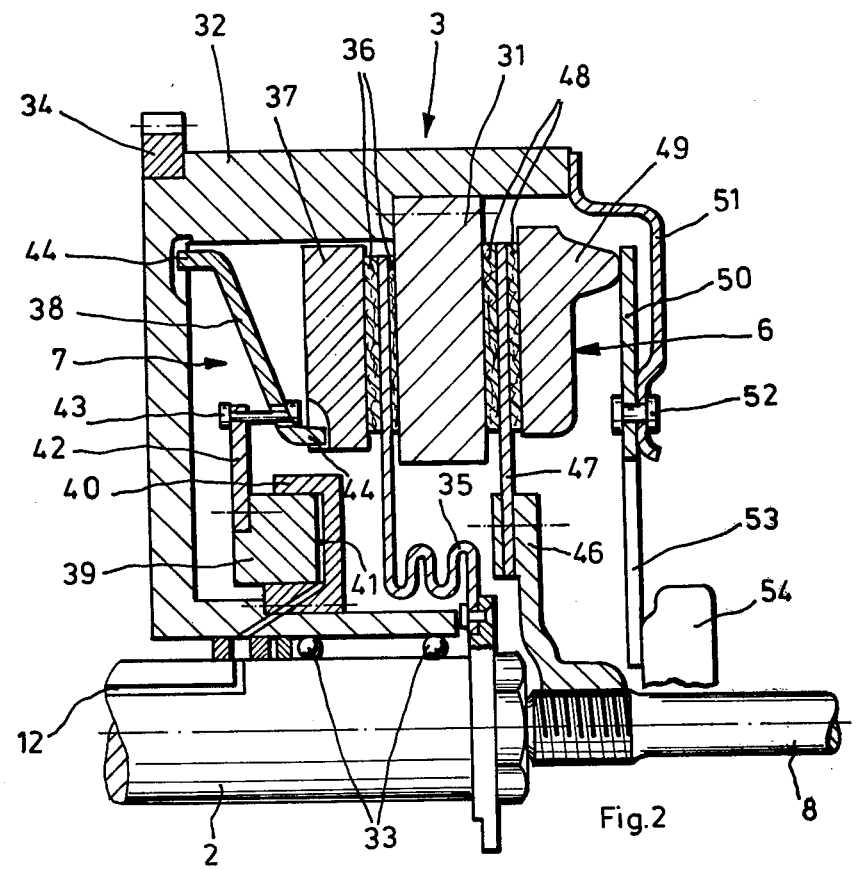
FIG. 2 is a longitudinal section view through a structural unit including a flywheel, a main clutch, and a flywheel clutch according to the present invention.
Figure 3:
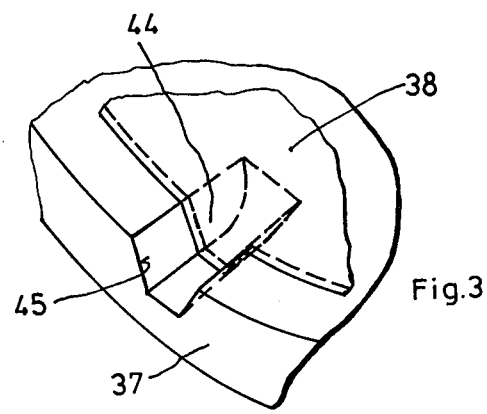
FIG. 3 is a detailed view of a portion of the flywheel clutch on a larger scale.

FIGS. 2 and 3 show an example of an embodiment for the structural shaping of an aggregate flywheel 3, main clutch 6 and flywheel clutch 7. A clutch disk 31 is fixed on an enclosing flywheel housing 32 which, in turn, is supported by a bearing 33 on the crankshaft 2 protruding from the engine, not shown in this figure. On the outer periphery of the flywheel housing 32 a toothing 34 is provided for engagement of the pinion, not shown, of a starter motor.

The flywheel clutch 7 is housed in a portion of the flywheel housing 32 and has a driving plate 25 rigidly connected to the crankshaft 2. Due to its corrugated form, the plate 35 has little axial flexibility. Clutch linings 36 are arranged in the vicinity of the outer periphery of the driving plate 35 between one end face of a clutch disk 31 and a pressure plate 37 and which on presence of an axial compression force caused by a plate spring 38 produce a friction connection between the crankshaft 2 and the flywheel 3. The plate spring 38 at the same time provides play-free force transmission from the crankshaft 2 to the flywheel 3 by being engaged, as shown by the structural detail in FIG. 3, with its spring tongs 44, arranged on its end faces, in conically tapering recesses 45 on the flywheel housing 32 and, respectively, the pressure plate 37.

The disengagement of the flywheel clutch 7 is effected by an actuating piston 39 which slides in an actuating cylinder 40 connected with the flywheel housing 32 and acts on the plate spring 38 by way of a butt plate 42 and a joining element 43. The pressure cavity 41 formed in the actuating cylinder 40 is connected with the supply line 12 from the control valve 10, the supply line 12 extending at least partly within the crankshaft 2. Upon opening of the control valve 10 by the control device 15, the control clutch 7 will be disengaged, whereas upon closing of the control valve 10, the clutch will once again be engaged through spring force. This design ensures faultless and safe operation of the vehicle, since, upon the failure or breakdown of the control device or upon loss of fluid pressure, the vehicle will continue to operate with the flywheel and engine continually engaged. Evidently, the control actions on the flywheel clutch 7 may also occur in reverse, i.e., the engagement may be obtained through spring force and the disengagement through oil pressure. In case of such a design, starting of the driving engine could be obtained in an especially simple manner in that the starting motor would have to rotate only the flywheel uncoupled from the engine. In the event that this simplification is to be obtained for the embodiment shown in the drawing, too, the clutch would first have to be disengaged by means of oil pressure, requiring a separately driven pump with an associated reservoir.

In contrast to the embodiment shown in the drawing, the control clutch 7 may also be designed as a purely mechanically operating clutch, in which case the servo forces used for automatic actuation will be provided for outside of the clutch proper.

In addition to the flywheel clutch 7, in the embodiment as per FIG. 2 the main clutch 6 is also combined with the flywheel 3 so as to form a single structural unit. The main clutch 6 consists of an entraining disk 46 fixed on a gear primary shaft 8. A lining support disk 47 is fixed on the entraining disk 46 with clutch linings 48 arranged on either side. The clutch linings 48 are placed between a pressure plate 49 and the end face of the clutch disk 31 facing away from the control clutch 7. A diaphragm spring 50, which is fixed by rivets 52 on a holding ring 51 fastened to the flywheel housing 32, applies pressure to the pressure plate 49. On its radially inner end, the annular diaphragm spring 50 is provided with spring tongs 53 which in the customary manner can be acted on by a clutch thrust bearing 54 axially for disengagement at will of the main clutch.

As mentioned above, the main clutch 6 could be designed in the same manner as the control clutch 7 for automatic disengagement by means of hydraulic, pneumatic or electric-servo forces. In such a case, the automatic disengagement could likewise be controlled by a control device as a function, e.g., of the rotational velocity of the flywheel, the position of the accelerator pedal, the speed of travel of the automobile, the gear position and/or the brake actuation, in order to facilitate at periods of stopping or deceleration of the vehicle a continued rotation of the flywheel as an energy reservoir for a subsequent energy-saving starting of the driving motor.

A time function element may also be incorporated into the control device 15. This element would operate so that at only momentary occurrences of idling and deceleration states, such as during gear shifting processes, the control clutch and the main clutch are not automatically actuated. In such a case, the control or switching signals are transmitted to the control valve or other control devices, e.g., for interruption of the ignition for the fuel supply only after an extended presence of the control conditions. In order to prevent the flywheel, after extended rotation in the doubly disengaged state, from reaching a decreased speed insufficient to restart the engine, the control device 15 is designed so that should the speed fall below a preset minimum, the flywheel is again connected with the engine 1 or is again caused to rotate at a higher speed by other driving means, e.g., the starter motor acting on the flywheel.

Although the invention has been illustrated and described herein with reference to specific embodiments thereof in the form of apparatus and methods it will be understood that such embodiments are susceptible of modification and variation without departing from the inventive concepts embodied therein. All such modifications and variations, therefore, are intended to be encompassed within the spirit and scope of the appended claims.

Finally the practical operation of a motor vehicle equipped with an apparatus in accordance with the invention will be described as follows. To start the motor vehicle the flywheel in the doubly disengaged state initially is rotated by means of the starter motor to a speed sufficient to start the engine. The automatical operation of the clutches is then caused by depressing the gas pedal by the driver engaging first the flywheel clutch and subsequently the main clutch, so that the engine now can drive the wheels of the vehicle in the usual manner.

But if the gas pedal is completely released by the driver, for example during periods of deceleration, coasting, and stopping due to traffic the clutches are once more caused to be automatically disengaged and the engine is caused to turn off. Thus only the flywheel continues to rotate freely storing kinetic energy and avoiding useless consumption of fuel and decreasing the noise and the elimination of noxious substances in the exhaust gas of the automobile. If thereby the rotating flywheel runs the risk to reach a decreased speed insufficient to restart the engine, then for a short time the flywheel is again connected with the engine or with the starter motor to be caused to rotate at a higher speed.

In order to terminate that freewheel operating condition and to start again the engine, the driver only has to depress the gas pedal thus causing to engage the clutches and to drive the vehicle by the engine.

At last it is pointed out to the fact, that the flywheel used in the system according to the invention, substantially is the same as used in the conventional automobile engines for equalizing the non-uniformity of the engine output torque. Only by arranging an automatically operated clutch between the flywheel and the engine there is achieved a very simple and effective storing system for kinetic energy, which is in the position to bridge operating conditions of the automobile with poor efficiency, such as idling or coasting, in continuous operating readiness.

We claim:

1. A method of operating a motor vehicle having an internal combustion engine and a drive train coupled to said engine for driving the driving wheels of said vehicle, wherein said drive train includes a transmission means, a flywheel means normally present in said drive train for equalizing non-uniformities of engine output torque and arranged between said engine and said transmission means, and first interrupting means for interrupting the coupling between said flywheel means and said driving wheels, said method comprising:

providing second interrupting means for interrupting the coupling between said engine and said flywheel means, a controlling means for automatically controlling said second interrupting means, means for detecting at least one parameter characteristic of the operating state of the engine, and signal generating means for delivering at least one control signal to said controlling means representative of said parameters, said controlling means being responsive to said control signals;

delivering a control signal from said signal generating means to said controlling means for automatically interrupting said coupling between said engine and said flywheel means and stopping said engine at operating conditions wherein both said engine is not providing a driving force and said flywheel means rotates above a predetermined minimum speed; and delivering a control signal from said signal generating means to said controlling means for re-coupling said flywheel means to said engine to restart said engine upon termination of said operating conditions.

2. A method according to claim 1, wherein said control parameter comprises engine output.

3. A method according to claim 1, wherein said control parameter is representative of the position of the intake throttle.

4. A method according to claim 1, wherein said control parameter comprises the instantaneous rotational speed of said flywheel.

5. A method according to claim 1, wherein said control parameter comprises the speed of travel of said vehicle.

6. A method according to claim 1, wherein said transmission means has a plurality of operating positions, and wherein said control parameter comprises the said operating position.

7. A method according to claim 1, wherein said control parameter conprises the inclination of said vehicle.

8. A method according to claim 1, wherein said engine comprises ignition means, and wherein said engine is stopped by interruption of said ignition means.

9. A method according to claim 1 wherein said drive train includes coupling means between said flywheel means and said transmission means, said method further comprising interrupting said coupling between said flywheel means and said transmission at predetermined operating states of said vehicle, and re-coupling said flywheel means to said transmission upon termination of said operating states.

10. A method according to claim 9, wherein said vehicle includes a foot brake, and wherein said coupling between said flywheel means and said transmission is interrupted on application of said foot brake.

11. A method according to claim 9, wherein said vehicle includes a gas pedal means, and wherein said coupling between said flywheel means and said transmission is interrupted on release of said gas pedal.

12. In a motor vehicle having an internal combustion engine and a drive train coupled to said engine for driving the driving wheels of said vehicle, wherein said drive train includes a transmission means, a flywheel means normally present in said drive train for equalizing nonuniformities of engine output torque and arranged in said drive train between said engine and said transmission means, and means for interrupting the coupling between said flywheel means and said driving wheels, the improvement comprising controllable clutch means arranged in said drive train between said engine and said flywheel means for automatically interrupting said coupling at operating conditions wherein both said engine is not providing a driving force and said flywheel means rotates above a predetermined minimum speed, and for re-coupling said flywheel means to said engine when said operating conditions are terminated, and further comprising a controlling means for automatically controlling said clutch means, means for detecting one or more parameters characteristic of the operating state of the engine, and means providing one or more control signals to said controlling means representative of said parameters, said controlling means being responsive to said control signals.

13. Apparatus according to claim 12, wherein said engine comprises ignition means and wherein said controlling means includes means for emitting a signal for interrupting said ignition means at said operating conditions.

14. Apparatus according to claim 12, wherein said vehicle comprises fuel delivery means for supplying fuel to said engine and wherein said controlling means includes means for emitting a signal for interrupting said fuel delivery means at said operating conditions.

15. Apparatus according to claim 12, wherein said control signals comprise a signal representative of engine output.

16. Apparatus according to claim 15, wherein said vehicle comprises gas pedal means having a plurality of operating position including an idling position determining the engine output, and said apparatus further comprises a switch means actuated in the idling position of said gas pedal means, said switch means including means for delivering a control signal to said controlling means for controlling said clutch means.

17. Apparatus according to claim 12, wherein said control signals comprise a signal representative of the instantaneous rotational speed of said flywheel.

18. Apparatus according to claim 12, wherein said control signals comprise a signal representative of the inclination of the vehicle.

19. Apparatus according to claim 12, wherein said controlling means comprises a time function means for delaying the actuation of said clutch for a predetermined time period after receiving said control signals.

20. Apparatus according to claim 12, wherein said controlling means comprises a manual override means for preventing interruption of said coupling during all operating conditions of said engine.

21. Apparatus according to claim 12, wherein said vehicle comprises a main clutch arranged in said drive train between said flywheel means and said transmission means, and said apparatus further comprises means responsive to the operating state of said engine for automatically disengaging said main clutch at predetermined operating states of said engine.

22. Apparatus according to claim 21, wherein said main clutch is disengaged where the instantaneous rotational speed of said flywheel means exceeds a predetermined limit.

23. Apparatus according to claim 21 or 22, wherein said vehicle comprises a foot brake, and wherein said main clutch is disengaged upon application of said foot brake.

24. Apparatus according to claim 21, wherein said vehicle comprises a gas pedal means, and wherein said main clutch is disengaged upon release of said gas pedal.

* * * * *